Nov. 23, 1965  F. E. MYARD  3,218,875

FRICTION TYPE VARIABLE SPEED DRIVE

Filed Nov. 6, 1963

United States Patent Office 3,218,875
Patented Nov. 23, 1965

3,218,875
FRICTION TYPE VARIABLE SPEED DRIVE
Francis Emile Myard, Paris, France, assignor to Etablissements Grangier & Cie, Paris, France, a society of France
Filed Nov. 6, 1963, Ser. No. 321,976
Claims priority, application France, Nov. 8, 1962, 914,739
18 Claims. (Cl. 74—197)

This invention relates to friction-type variable speed drives which employ a drive plate the axis of which is perpendicular to that of a driven roller, said roller running on a course on the said plate the radius of which course can be varied by axial displacement of the roller using an appropriate mechanism.

It is known to form the driven roller as a rotor on which solids of rotation are freely mounted in directions at right angles to its axis, the common envelope of which solids is circular. This special form of driven roller, on being axially displaced, results in the substitution of rolling for the sliding action which is encountered in variable speed units employing ordinary rollers. Thus, the use of a composite roller of this type, i.e. in the form of a rotating torus, sections of which can rotate independently, on the one hand enables the control sensitivity to be increased and on the other results in an increase in the transmissible power, since the grip of the roller on the plate or plates can be increased without influencing the roller's ability to be axially displaced; the grip is thus no longer limited.

An object of the present invention is to improve variable speed drives of the friction type, especially those which incorporate a composite driven roller.

According to the present invention a friction type variable speed drive includes a driven rotor on which curved solids of rotation are freely mounted in directions at right angles to its axis of rotation, the common envelope of which solids is circular, the solids of rotation cooperating with at least one rotatable drive plate and being operatively connected to a mechanism for displacing them from the center of the drive plate towards the latter's periphery, the radius of curvature of the generatrices of the solids of revolution being constant throughout the whole of their length and equivalent to the radius of their common circular envelope, each of the said solids having an ogived end and a truncated end which cooperate to seat against one another on adjacent solids.

Preferably the truncated end of each solid of revolution takes the form of a concave spherical surface whose center is located on the axis of the solid and the radius of curvature of which is equal to that of the generatrices of the said solid.

Conveniently the driven rotor may comprise two tubular elements which are aligned with one another and are contiguous in a plane perpendicular to their common axis, these tubular elements engaging guide journals provided on the solids of revolution.

Each solid of revolution in the driven rotor, may have two journals formed at the bottom of grooves therein which accept two bearings, each of the bearings being formed by two tongues on the contiguous elements of the said rotor, and extending parallel to that radial plane of the rotor passing through the largest section of the solid of revolution concerned.

Preferably the driven rotor has a number of solids of revolution which is at least one greater than the number of drive plates, and the solids of revolution and the drive plates may have rough surfaces in order to improve the grip between them.

The parts which carry the journals of the solids of revolution may be provided with bearing shells or bushes and preferably drive plates are synchronously coupled to a drive member and are acted on by a pressure-exerting element which forces them into contact with the solids of revolution in the rotor.

In a preferred arrangement each drive plate is linked, through a sliding coupling to a bevel gear and abuts a seating which is loaded by a spring in turn seated in a fixed housing, which housing carries the bevel gears for the drive plates and a bevelled drive gear meshing with the said other bevel gears.

Various other features of the invention will become apparent in the course of the following detailed description.

One embodiment of the subject of the invention is illustrated in the attached drawing, although this in no way limits the scope of the invention.

Figure 2:
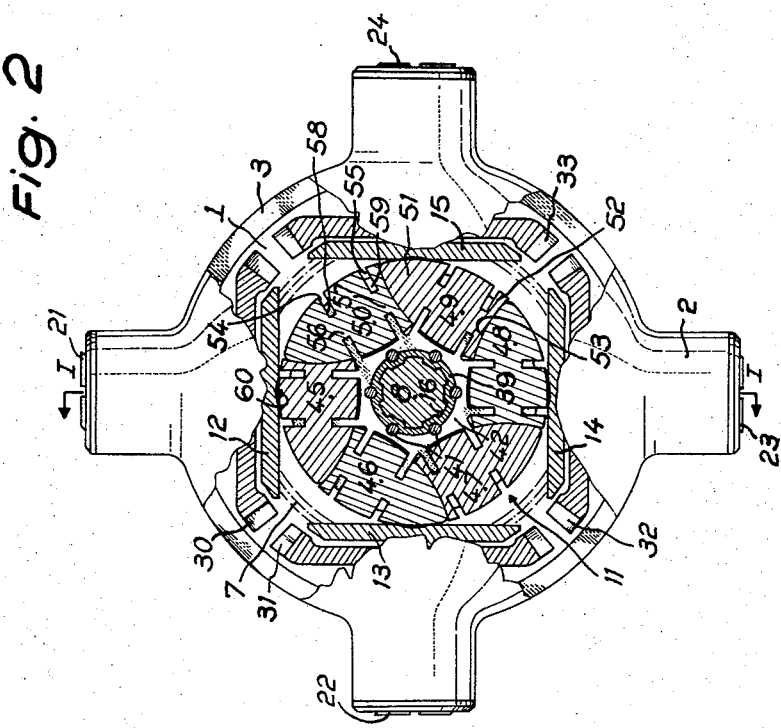
FIGURE 2 is a transverse section taken on the line II—II of FIGURE 1.
Figure 1:
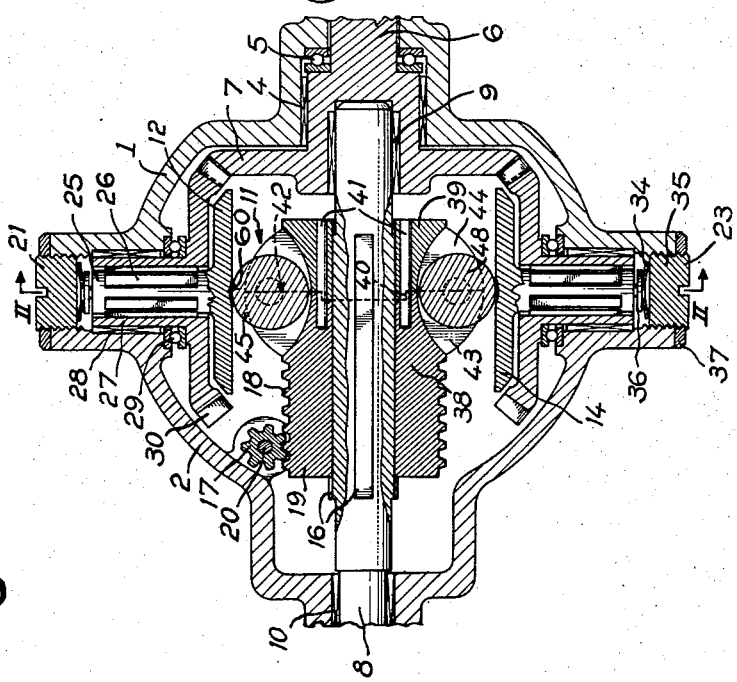
FIGURE 1 is a longitudinal section taken on the line I—I of FIGURE 2.

The variable speed unit in accordance with the invention is contained in a fixed housing comprising two halves 1 and 2 assembled together and sealed at the resultant joint formed in the plane 3. The half 1 carries a drive shaft 6 in a needle roller bearing 4 and a ball thrust bearing 5, this shaft being integral with a primary bevel gear 7. The drive shaft operates a takeoff shaft 8 with which it is in alignment. This takeoff shaft is supported at one end in the drive shaft and at the other end in the half 2 of the housing, by means of needle roller bearings 9 and 10 respectively.

The variable speed unit is substantially comprised by a driven roller 11 coupled to the takeoff shaft 8 on the one hand, and by the drive plates 12 to 15, driven by the drive shaft 6, on the other.

In the example illustrated, the driven roller 11 is situated coaxially with respect to the said takeoff shaft 8 and connected to it via a sliding coupling 16, which coupling can be formed quite simply by providing milled grooves in the roller and shaft. In this way, the driven roller can transmit a torque, at the angular speed at which it is driven, to the takeoff shaft and can also be displaced in the direction of its axis. To this end, it is operated by a direct control mechanism, servo-operated or otherwise and possibly programmed. This mechanism can be constituted by a pinion 17 engaging with annular ridges 18 formed on an extension 19 of the driven roller, which ridges have a gear tooth profile so that a round rack results; the pinion is integral with a shaft 20 carried in the housing 1, 2.

The drive plates 12 to 15 number as many as are required to transmit the drive power to the driven roller 11, without exceeding the limiting grip. In the example under consideration, four such plates are provided. The axes of these plates are perpendicular to the common axis of the shafts 6 and 8 and are located in the joint plane 3 in order to facilitate the assembly of the components described hereinafter.

These plates are mounted in the housing 1, 2 rotated by the drive shaft 6 and forced into contact with the driven roller 11 by means of pressure-exerting members 21 to 24. In the preferred embodiment illustrated by way of example, each drive plate is integral with a shaft 25 connected, via a sliding coupling 26, e.g. employing splines, to the tubular shaft 27 which shaft is mounted in the housing 1, 2 by means of a needle roller bearing 28 and a ball thrust bearing 29. The tubular shafts 27 are integral with secondary bevel gears 30 to 33 which engage with the primary bevel gear 7 already mentioned.

Each of the pressure-exerting elements 21, 22, 23 or 24 can be constituted by at least one elastically deformable washer 34, of the type known as a Belleville washer, or by any other appropriate spring device. The washer 34 is inserted between a seating plug 35 screwed into a boss in the housing 1, 2 and a seating 36 in contact with the shaft 25 of the corresponding plate. The seating 36 may be arranged to swivel but it appears more advantageous to design it in the manner illustrated in the drawing, in the form of a bead or pivot locating in a small register in the center of the shaft 25 and extended in the form of a supporting collar and a centering pip for the elastic washer or washers.

It is pointed out that the plug 35 at the same time serves to control the tension of the spring 34. In addition, a locknut 37 is provided which enables the plug to be fixed in position as soon as the desired loading has been set.

Besides the characteristic features illustrated and described in the foregoing, the invention is substantially concerned with the shape and construction of the driven roller 11. The aim is to make this as nearly as possible a rotating torus, the circular sections of which can themselves turn freely.

The driven roller comprises a rotor formed from two tubular elements 38 and 39 held in coaxial relationship with one another by a cylindrical centering piece 40 and locked as far as angular movement is concerned by means of shear pins 41, in such fashion that the female parts of the splines 16 are precisely and fixedly aligned. The tubular elements 38 and 39 are contiguous in a plane 42 which is perpendicular to their common axis. These elements have projections at either side of the plane 42, in the form of tongues 43 and 44 arranged opposite one another as to form split bearings in which the solids of revolution 45 to 50 are carried. These solids are at least one greater in number than the number of drive plates 12 to 15, simply in order that no one of the said solids shall at any time be in contact with two plates. Thus, in the example under consideration, the driven roller 11 has six solids of revolution cooperating with four drive plates.

The generatrices of the solids of revolution have a constant radius of curvature which is common to them all. In addition, the center of curvature of the generatrix of each solid, the generatrix being situated in the joint plane 42 and corresponding to a position on the periphery of the driven roller 11, is located on the axis of the elements 38 and 39 of the rotor and is common to all the solids so that the said periphery is perforce circular. In addition, the axis of each solid of revolution is tangential to a circle struck from the same center and passing through this same axis at the largest section of the body.

The solids of revolution 45 to 50 can have two ogived ends, and in arrangement they would be disposed tip to tip. The tangential force exerted on the bodies 45 to 50 during the transmission of a torque through the drive plates 12 to 15 to the driven roller 11, can only be transmitted to the rotor 38, 39 of the said roller through the bearings 43, 44 and these, if they are too thin, may tend to distort since the solids are unable to supply a resisting effort. In order to overcome this drawback, and to distribute the tangential effort over all the bearings, seatings are created between all the solids of revolution 45 to 50.

In accordance with the embodiment, illustrated in the drawing, each solid of revolution has only one ogived end 51 and one truncated end 52. The ogived ends 51 of the solids abut the truncated ends 52 of the contiguous solids, thus forming the seating.

The truncated end 52 of each solid of revolution is in the form of a concave spherical surface 53 the center of which is located on the axis of the solid and the radius of curvature of which is equivalent to that of the solid. Thus, the center of curvature under discussion is identical with that of the internal generatrix of the contiguous solids which generatrix lies in the joint plane 42. In consequence, the contact between two adjacent solids is along a circular arc and this mutual abutment (seating) between all the solids therefore enables the tangential effort to be distributed amongst all the bearings.

In addition, each solid of revolution 45, 46, 47, 48, 49 or 50 has two journals 56, 57 at the bottom of slots 54, 55, these journals extending along the axis of the solid concerned; there may be only one such journal, or again, several. These two journals are carried, possibly with the interposition of bearing shells or bushes, by two split bearings 58, 59 formed by the two sets of tongues 43, 44 disposed on the rotor as described earlier. The bearings 58, 59 for each solid of revolution are situated parallel to that radial plane of the rotor 38, 39 passing through the largest section of the solid concerned, and project into a location formed in the said rotor which location mates with the shape of the solid in such fashion as to leave a small clearance. Thus, the said locations are hollowed symmetrically out of the cylindrical elements 38 and 39 so that a section through the rotor taken in the joint plane 42 has the form of a hexagon with concave sides. The bearings 58, 59 can be located symmetrically in relation to the aforedescribed radial plane but in the example under consideration, in which the solids of revolution 45 to 50 have one truncated end 52, this is out of the question. Here, they are disposed close to the seatings 53 since it is advantageous to space them apart as much as possible.

From the foregoing, it will be seen that the driven roller 11 thus constructed is similar in effect, at those of its zones instantaneously in contact with the drive plates 12 to 15, to a toroidal roller, sections of which can rotate about their own axes. In this way, a very high degree of grip between the drive plates 12 to 15 and the solids of revolution 45 to 50 in the driven roller 11 can be achieved in order thereby to achieve a high transmitted torque. Moreover, this high grip does not, as has hitherto been the case, impede the displacement of the said roller in an axial direction with respect to the takeoff shaft 8 and in a radial direction with respect to the said drive plates; this displacement is effected by the pinion 17 of the control mechanism in order to produce a variation in speed and in the transmitted torque.

The increased grip is the product of an increase in the number of drive plates 12 to 15, of an increase in the number and force of the pressure-exerting members 21 to 24, and, finally, of an increase in the coefficient of friction. As far as the latter is concerned, a careful choice is made of the contacting materials and rough surfaces are provided on the plates 12 to 15 and solids of revolution 45 to 50. For example, the plates can be lined with materials known under the name of "FERODO" and the solids of revolution can be made of grooved, engraved, knurled, milled or similarly treated steel.

The driven roller 11 has of course discontinuities, particularly at the slots 54, 55 and seatings 53, however these do not affect the smoothness of the drive since when one comes opposite a plate all the other plates are in contact with continuous parts of the roller.

As is well known, in order to vary the speed of the takeoff shaft 8, it is merely necessary, using the control mechanism 17–18, to displace the driven roller 11 along the said shaft between the following characteristic positions:

roller at the center of the drive plates 12 to 15 (speed zero);

roller opposite a peripheral zone of these plates (maximum speed in one direction);

roller opposite the diametrally opposite peripheral zone of the said plates (maximum speed in the other direction).

In addition, when the roller is at the center of the plates (zero speed), it is desirable to avoid all contact between the two, since this would result in unnecessary wear. To this end, central hollows 60 are formed in the plates the depth of which is such that when the pressure-exerting members 21 to 24 are at their full extent, the bases of the hollows are clear of the roller.

The variable speed drive illustrated in the drawing is a constant-torque drive since the pressure exerted by the springs 34 is for all practical purposes the same whatever the diameter of the track followed by the roller 11 on the plates 12 to 15.

In order to obtain more or less constant power, the plates 12 to 15 can be made very slightly conical such that if the roller 11 is displaced towards the center the pressure of the springs 34 increases thus enabling a higher torque to be transmitted in the lower speed range of the secondary shaft 8.

The invention is in no way limited to the embodiment illustrated and described in detail since its scope admits of various modifications.

I claim:
1. Friction type variable speed drive including a driven rotor on which curved solids of rotation are freely mounted in directions at right angles to its axis of rotation, the common envelope of which solids is circular, the solids of rotation cooperating with at least one rotatable drive plate and being operatively connected to a mechanism for displacing them from the centre of the drive plate towards the latter's periphery, the radius of curvature of the generatrices of the solids of revolution being constant throughout the whole of their length and equivalent to the radius of their common circular envelope, each of the said solids having an ogived end, and a truncated end which cooperate to seat against one another, on adjacent solids.

2. Variable speed drive as claimed in claim 1 in which the truncated end of said solid of revolution is in the form of a concave spherical surface whose centre is located on the axis of the solid and the radius of curvature of which is equal to that of the generatrices of the said solid.

3. Variable speed device as claimed in claim 2 in which the driven rotor comprises two tubular elements which are aligned with one another and are contiguous in a plane perpendicular to their common axis, these tubular elements engaging guide journals provided on the solids of revolution.

4. Variable speed drive as claimed in claim 3 in which each solid of revolution in the driven rotor has two journals formed at the bottom of grooves therein which accept two bearings, each of the bearings being formed by two tongues on the contiguous elements of the said rotor, and extending parallel to that radial plane of the rotor passing through the largest section on the solid of revolution concerned.

5. Variable speed drive as claimed in claim 4 in which the parts of the rotor which carry the journals of the solids of revolution are provided with bearing bushes.

6. Variable speed drive as claimed in claim 5 in which the driven rotor has a number of solids of revolution which is at least one greater than the number of drive plates.

7. Variable speed drive as claimed in claim 6 in which the solids of revolution and the drive plates have rough surfaces which increase the grip between them.

8. Variable speed drive as claimed in claim 7 in which the drive plates are synchronously coupled to a drive member and are acted upon by a pressure-exerting element which forces them into contact with the solids of revolution on the rotor.

9. Variable speed drive as claimed in claim 8 in which each drive plate is linked through a sliding coupling to a bevel gear and abuts a seating in said element which is loaded by a spring in turn seated in a fixed housing which housing carries the bevel gears for the drive plates and a bevelled drive gear meshing with the said bevel gears.

10. Variable speed drive as claimed in claim 1 in which the driven rotor comprises two tubular elements which are aligned with one another and are contiguous in a plane perpendicular to their common axis, these tubular elements engaging guide journals provided on the solids of revolution.

11. Variable speed drive as claimed in claim 10 in which each solid of revolution in the driven rotor has two journals formed at the bottom of grooves therein which accept two bearings, each of the bearings being formed by two tongues on the contiguous elements of the said rotor, and extending parallel to that radial plane of the rotor passing through the largest section of the solid of revolution concerned.

12. Variable speed drive as claimed in claim 11 in which the parts of the rotor which carry the journals of the solids of revolution are provided with bearing bushes.

13. Variable speed drive as claimed in claim 1 in which the driven rotor has a number of solids of revolution which is at least one greater than the number of drive plates.

14. Variable speed drive as claimed in claim 13 in which the drive plates are synchronously coupled to a drive member and are acted upon by a pressure-exerting element which forces them into contact with the solids of revolution on the rotor.

15. Variable speed drive as claimed in claim 1 in which the drive plates are synchronously coupled to a drive member and are acted upon by a pressure-exerting element which forces them into contact with the solids of revolution on the rotor.

16. Variable speed drive as claimed in claim 15 in which each drive plate is linked through sliding coupling to a bevel gear and abuts a seating in said element which is loaded by a spring in turn seated in a fixed housing which housing carries the bevel gears for the drive plates and a bevelled drive gear meshing with the said other bevel gears.

17. Variable speed drive as claimed in claim 1 in which the solids of revolution and the drive plates have rough surfaces which increase the grip between them.

18. Variable speed drive as claimed in claim 1 in which each drive plate is linked through sliding coupling to a bevel gear and abuts a seating which is loaded by a spring in turn seated in a fixed housing which housing carries the bevel gears for the drive plates and a bevelled drive gear meshing with the said other bevel gears.

No references cited.

DON A. WAITE, *Primary Examiner.*